Jan. 1, 1957 A. NICHOLS 2,776,144

PHONOGRAPH TONE ARM MOUNTING

Filed Jan. 23, 1952

INVENTOR
AUGUST NICHOLS
BY
Henry M. Chapin
ATTORNEY

United States Patent Office 2,776,144

Patented Jan. 1, 1957

2,776,144

PHONOGRAPH TONE ARM MOUNTING

August Nichols, New York, N. Y., assignor to Joseph V. Caltagirone

Application January 23, 1952, Serial No. 267,845

4 Claims. (Cl. 274—23)

This invention relates to a phonograph having an improved mounting for a play-back tone arm.

In recent years microgroove phonograph recordings have been made on thin vinyl plastic discs as thin as 0.01 inch. As many as 350 shallow grooves to the radial inch have been inscribed on such records by embossing or cutting. When playing back the sound from such records it was found, prior to the present invention, that the tone arm tended to bounce or slide out of the groove and skate across the record toward or away from its center when the phonograph was jarred or was tilted slightly off level. Even when actual skating did not occur, the skating tendency was always present and caused the stylus to follow only one side of the wall of the sound groove. Under such conditions the fidelity of sound reproduction was poorer than desired because of excessive wear on one wall, and because only one half of the sound track was reproduced satisfactorily. Different tone arms have been found to vary in their tendency to skate, and in the direction of skating, and prior to the present invention there was no known way of adjusting each individual tone arm to overcome its skating tendency.

I have found that I can reduce to a minimum the tendency of a tone arm to skate by observing two important principles of design. In the first place, I counteract any tendency of the reproducing stylus to climb one side of the groove or the other by adjusting the tone arm to substantially eliminate such tendency. This is done by mounting the tone arm in such a way that it can be adjusted to produce a constantly changing pressure between the record and the stylus as the latter moves from the periphery toward the center. If the skating tendency is away from the center, the tone arm is adjusted to produce a constantly decreasing pressure; and if the skating tendency is toward the center, the tone arm is adjusted to produce a constantly increasing pressure.

In the second place, I relieve the stylus of the deadweight of the tone arm by substantially evenly balancing the tone arm at a point between its ends, and then applying a fixed force to the tone arm by resilient means such as a spring to urge the stylus down against the record. Bouncing of the stylus out of the groove is thus practically eliminated. Also, a record can be played even when tilted to the horizontal.

The mechanism by which the foregoing principles of design are incorporated in a practical phonograph will be described in detail below, with reference to the accompanying drawings wherein.

Figures 1, 2, 3, 4:
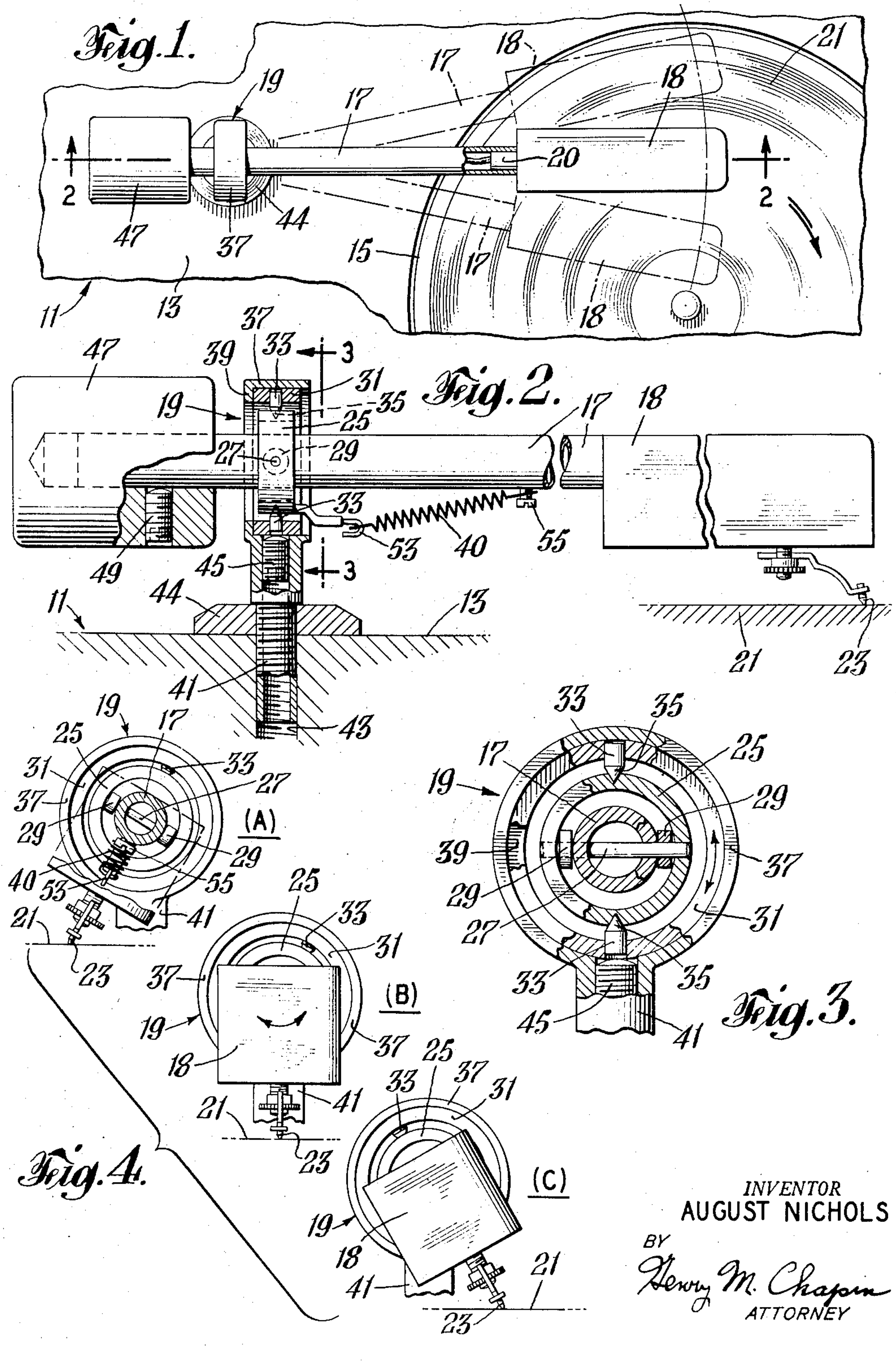
Figure 1 is a plan view of a part of a phonograph embodying the invention.
Figure 2 is a sectional view taken along the line 2—2 in Figure 1, parts being shown in elevation.
Figure 3 is a cross-sectional view taken along the line 3—3 in Figure 2.
Figure 4 is an end view of a tone arm as seen from the right in Figure 2, showing three adjusted positions A, B and C of the tone arm, somewhat exaggerated for clarity.

As shown in the drawings a phonograph embodying the invention comprises a cabinet 11 having a horizontal top surface 13, and a rotatable horizontal tablet table 15 driven by conventional mechanism (not shown).

A hollow tone arm 17 carrying a stylus head 18 is pivotally mounted on a tone arm support 19 to swing parallel to the table 15 and a record 21 thereon, and also for limited movement up and down to permit a stylus 23 near the end of the tone arm to be lifted out of and replaced in the record groove. Stylus head 18 includes a boss 20 which fits tightly inside tone arm 17 and permits the stylus head to be rotatably adjusted relatively to the tone arm.

Tone arm support 19, which is spaced laterally from table 15, comprises an inner ring 25 surrounding and concentric with the tone arm 17 and pivotally secured thereto at its balance point by a pivot pin 27 extending horizontally through the tone arm and into the inner ring at opposite points. A pair of spacers 29 is located between the tone arm and the inner ring on opposite sides of the tone arm.

An intermediate ring 31 surrounding and concentric with ring 25, and spaced therefrom carries a pair of oppositely disposed upright pivot pins 33 which have conical points 35 arranged in conical cavities in the inner ring 25 so that the latter is pivotally mounted on the ring 31.

Intermediate ring 31 in turn is bushed in an outer ring 37 having an inturned flange 39, and is rotatably adjustable therein in opposite directions to tilt the pivot pins 33 as desired on both sides of the vertical.

A spring 40 extends from tone arm 17 to one of the inner and intermediate rings 25 and 31 to urge the stylus 23 toward a record. Spring 40 moves in unison with arm 17 and inner ring 25 when intermediate ring 31 is adjusted in outer ring 37.

It will be seen from the construction described above that the inner ring 25 is pivotally secured to intermediate ring 31 on an upright pivot axis for movement in a first plane normal to the plane of the intermediate ring. Also, the tone arm 17 is pivotally secured to inner ring 25 for movement in a second plane normal to both the first plane and the plane of the intermediate ring 31.

The outer ring 37 is carried on the top of a vertical hollow stem 41 which is threaded down into an aperture 43 in cabinet 11 and is held in adjusted position by a lock nut 44. A set screw 45 inside stem 41 can be turned to move it into and out of engagement with intermediate ring 31 for securing the latter in adjusted position. When adjustment of the intermediate ring is necessary, the stem 41 is removed from aperture 43, the set screw is loosened, the proper adjustment made, and the set screw tightened, whereupon the stem is returned to aperture 43. The set screw also can be reached from below the top surface 13 without removing stem 41.

Referring to Figure 4, if the stylus 23 tends to climb the outer wall of the groove and skate away from the center of the record the tone arm 17 is rotated by rotating intermediate ring 31 clockwise so that the top and bottom pivot pins 33 are located on the right and left of the vertical, respectively, and stylus 23 is tilted down toward the left as shown at A. Then the stylus head 18 is rotated in arm 17 to return the stylus 23 to its normal position in a plane vertical to the record, as shown at B. Now, as the stylus follows a record groove from the periphery toward the center, the force exerted by the spring 40 automatically and continuously diminishes to compensate for the constantly changing effect of the record groove on the sylus as the diameter of the groove diminishes and the skating tendency normally tends to increase.

Conversely, if the stylus 23 tends to climb the inner wall of the groove and skate toward the center of the record it is found that the skating tendency is greatest at the periphery and diminishes toward the center. Therefore, the tone arm 17 is rotated by rotating intermediate ring 31 counterclockwise so that the top and bottom pivot pins 33 are located on the left and right of the vertical, respectively, and stylus 23 is tilted down toward the right as shown at B. Then the stylus head 18 is rotated to return the stylus 23 to a vertical plane. Now, as the stylus follows a record groove from the periphery toward the center, the force exerted by spring 40 is least at the periphery of the record where the skating tendency is greatest, and increases toward the center as the skating tendency normally decreases.

The proper adjustment of intermediate ring 31 is ideally that which produces zero skating tendency at all positions of the stylus 23 on the record, this being the ideal condition for reproducing true fidelity of sound. Normally the proper adjustment is to be made at the factory before the phonograph is sold to a consumer. No readjustment should be necessary thereafter until the stylus becomes badly worn, or until the stylus has been replaced.

Each phonograph presents its own adjustment problem when manufactured, but persons skilled in the art will experience no difficulty in establishing the proper position for the least skating tendency by following the foregoing description.

In my novel phonograph, the stylus 23 is relieved of the dead weight of the tone arm 17 by constructing the latter so that it passes through the inner ring 25 and projects from both sides of the ring on opposite sides of the pivot pin 27, which is located at the balance point of the arm. An accurate balance adjustment is assured by providing the tone arm with a counterweight 47 on one side of the support 19 which is movable lengthwise of the tone arm. The counterweight 47 shown is slidably adjustable along the projecting portion of the tone arm on the side of support 19 opposite stylus 23, and its position can be fixed by a set screw 49.

Once the tone arm 17 has been balanced, the resilient flexible coil spring device 40 is placed in position to urge the stylus 23 resiliently down toward the record 21 in the direction the stylus points. One end of spring device 40 comprises a hook 53 which is secured to the inner ring 25 adjacent the longitudinal axis of support 19 at a point in the vertical plane which includes the longitudinal axis of the tone arm and the axis of the pivot pins 33 and 35; and the other end of spring device 40 engages a screw 55 on the tone arm at a point in such vertical plane spaced longitudinally from the support 19 between the latter and the stylus end of the tone arm. With this construction the spring swivels with the tone arm 17 as the stylus 23 traverses the record and its force varies gradually except when the pivot pins 33 and 35 are vertical.

Changes in the construction and arrangement of parts can be made without departing from the principles of the invention.

I claim:

1. In a phonograph, a rotatable tablet table, a tone arm support located at one side of said tablet table and comprising an outer ring, an intermediate ring bushed in said outer ring and rotatably adjustable therein, and an inner ring within and pivotally secured to said intermediate ring on a pivot axis for movement in a first plane normal to the plane of said intermediate ring and rotatably adjustable with said intermediate ring; and a tone arm projecting from said tone arm support and having a stylus end remote from said support adapted to move over said tablet table, said tone arm being pivotally secured to said inner ring for movement in a second plane normal to both said first plane and said plane of said intermediate ring, said tone arm also being rotatably adjustable with said inner and intermediate rings and movable with said inner ring; and means for connecting a spring between said tone arm and said support for resiliently urging said stylus toward a record; whereby said tone arm is adjustable to be urged toward a record with a varying force as said tone arm moves from the periphery toward the center of a record.

2. In a phonograph, a rotatable tablet table, a tone arm support located at one side of said tablet table and comprising an outer ring, an intermediate ring bushed in said outer ring and rotatably adjustable therein, and an inner ring within and pivotally secured to said intermediate ring on a pivot axis for movement in a first plane normal to the plane of said intermediate ring and rotatably adjustable with said intermediate ring; a tone arm projecting from said support and having a stylus end remote from said support adapted to move over said tablet table, said tone arm being pivotally secured to said inner ring for movement in a second plane normal to both said first plane and said plane of said intermediate ring, said tone arm also being rotatably adjustable with said inner and intermediate rings and movable with said inner ring; and a spring operatively connected between said tone arm and one of said inner and intermediate rings and acting to resiliently urge said stylus toward a record; whereby said tone arm is adjustable to be urged toward a record with a varying force as said tone arm moves from the periphery toward the center of a record.

3. In a phonograph as claimed in claim 2, a cabinet having a top surface with an aperture therein; said tone arm support also comprising a hollow stem carrying said outer ring and having an open end extending down through said aperture and removable and replaceable at will therein, and means within said hollow stem and accessible from said open end movable into and out of engagement with said intermediate ring for securing the latter in adjustable position.

4. In a phonograph as claimed in claim 2, a stylus head carried by said tone arm on the stylus end thereof and rotatably adjustable thereon about the longitudinal axis thereof.

References Cited in the file of this patent

UNITED STATES PATENTS

| | | |
|---|---|---|
| 1,304,404 | Swing | May 29, 1919 |
| 1,312,959 | Davis et al. | Aug. 12, 1919 |
| 2,331,383 | Faulkner | Oct. 12, 1943 |
| 2,506,692 | Thompson | May 9, 1950 |
| 2,516,565 | Guy | July 25, 1950 |
| 2,551,506 | Rockwell | May 1, 1951 |
| 2,647,753 | Goldmark | Aug. 4, 1953 |
| 2,647,754 | Royston | Aug. 4, 1953 |

FOREIGN PATENTS

| | | |
|---|---|---|
| 550,080 | Germany | May 7, 1932 |